(12) United States Patent
Yoshida

(10) Patent No.: US 6,452,964 B1
(45) Date of Patent: Sep. 17, 2002

(54) ADAPTIVE MODULATION METHOD

(75) Inventor: Makoto Yoshida, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/274,783

(22) Filed: Mar. 23, 1999

(30) Foreign Application Priority Data

Jun. 5, 1998 (JP) .......................................... 10-158169

(51) Int. Cl.[7] .............................. H04B 1/38; H04L 5/16
(52) U.S. Cl. ...................... 375/222; 375/219; 375/262; 370/252
(58) Field of Search ................................ 375/262, 219, 375/142, 227, 222; 370/252, 347

(56) References Cited

U.S. PATENT DOCUMENTS

| | | | | |
|---|---|---|---|---|
| 5,535,238 A | * | 7/1996 | Schilling et al. | ............. 375/142 |
| 5,982,813 A | * | 11/1999 | Dutta et al. | .................. 370/232 |
| 6,108,374 A | * | 8/2000 | Balachandran et al. | ...... 375/227 |
| 6,130,882 A | * | 10/2000 | Levin | .......................... 370/252 |
| 6,198,734 B1 | * | 3/2001 | Edwards et al. | ............. 370/347 |
| 6,359,934 B1 | * | 3/2002 | Yoshida | ....................... 332/103 |

* cited by examiner

Primary Examiner—Stephen Chin
Assistant Examiner—Heechul Kim
(74) Attorney, Agent, or Firm—Katten Muchin Zavis Rosenman

(57) ABSTRACT

In the present invention, a modulation level estimation unit calculates the square error of the minimum value of distances between each signal point received at a modulation level ML and the signal point of a received signal at each modulation level ML. A received power measurement unit measures the received power level of the received signal. A modulation level estimation unit calculates the value obtained by multiplying the square error calculated at each modulation level ML, by a weighted calculation from both a threshold power level for switching the modulation level ML and the received power level as a likelihood value at each modulation level ML. Then, the modulation level estimation unit estimates a modulation level ML corresponding to the maximum likelihood value of all the likelihood values at the modulation level ML as a modulation level ML of the received signal, without transmitting any codewords on the used modulation level.

6 Claims, 11 Drawing Sheets

SYSTEM MODEL

EXAMPLE OF SIGNAL POINT ALLOCATION FOR EACH MODULATION

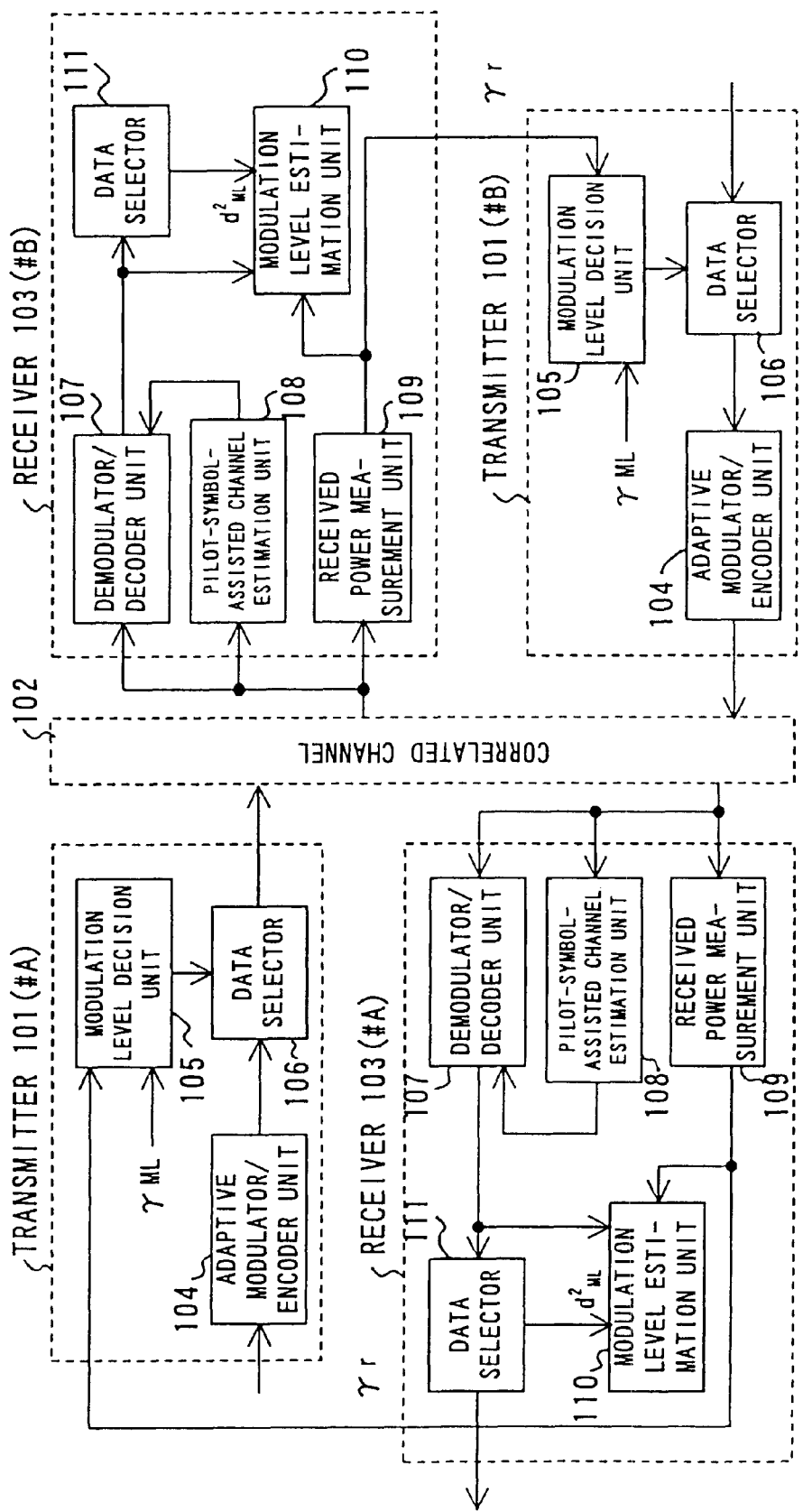
F I G. 2

ML: Symbols for Modulation Level
I: Information Symbols
L: Measurement Information Symbols for Estimation a channel estimating unit 1006 within the receiver 1003
at the station B on the first direction link estimates the power
gain of the channel 1002, and notifies of the estimated
channel information a demodulator/decoder unit 1007
within the receiver 1003 at the station B. The demodulator/
decoder unit 1007 demodulates/decodes the received signal
y(i) received from the first direction link after equlization
based on the estimated channel information. Furthermore,
the channel estimating unit 1006 within the receiver 1003 at
the station B notifies an adaptive modulator/encoder unit
1004 within the transmitter 1001 at the station B on the
second direction link, of the estimated channel information
(or the estimated information obtained by applying an
extrapolation-interpolation to the estimated power gain).
The adaptive modulator/encoder unit 1004 sets the modu-
lation level information according to the notified estimated
channel information, and sends the transmission signal x(i)
along with the modulation level information to the second
direction link on the channel 1002.

ADAPTIVE MODULATION METHOD

BACKGROUND OF THE INVENTION

1. Field of the Invention

The present invention relates to an adaptive modulation method which can be applied to a mobile communications system, and more particularly to an adaptive modulation method for changing a modulation level based on a channel power gain.

2. Description of the Related Art

In digital communications, particularly in mobile communications systems, it is widely known that line quality (such as a bit error rate) significantly degrades by variations in the received signal-to-noise ratio (SNR) due to fading. This phenomenon occurs when signal waves are affected by delayed signal waves including scattered signal waves. That is, the amplitude and the phase of a signal varies with time. The fading varies occur in the range of several tens of dBs.

The modulation method which is not adaptive to a fading channel (hereinafter referred to as a non-adaptive modulation method) is a method with which a modulation level (and a transmission power) is fixed. If this modulation method is applied, a fairly large link margin must be secured in order to maintain the channel quality allowed by the system in a time period during which the signal level drops due to fading (deep fades). To secure the link margin, for example, a strong error correction which trades off a transmission bandwidth must be applied. Namely, the system to which the non-adaptive modulation method is applied is effectively designed for the worst case channel conditions. Accordingly, with such a system, the channel capacity over fading channels cannot be efficiently utilized.

In recent years, an adaptive modulation method intended to efficiently utilize the capacity over a fading channel has been actively studied and developed.

The bit error rate performance of a modulation method depends on the distance between signal points implemented with the modulation method, that is, on Eb/No (or Es/No). This is common to any modulation methods.

Also an error correction technique intended to improve channel quality is a technique for regularly extending the distance between signal points by using redundant bits.

In fading channels, the probability of occurrence of the worst conditions is considerably small. That is, communications are made under the condition better than the maximum bit error rate allowed by the system in most of the total time. Accordingly, an optimum transmission can be realized by performing control so that the required bit error rate is maintained with an adaptive change of a transmission power level, a transmission symbol rate, a modulation level, a coding rate, or their combination, depending on a channel condition. This is the principle of an adaptive modulation method.

Adaptive modulation techniques provide high average spectral effectively by transmitting at high data rates with higher modulation levels under favorable channel conditions, and reducing throughput via lower modulation levels or transmission-off as the channel degrades.

The measurement of the channel condition can be performed by the instantaneous received SNR and the average received SNR.

FIG. 1A shows the principle of the adaptive modulation method. In this figure, x(i) is a transmission signal output from a transmitter 1001 at a station A which is a first station, y(i) is a received signal received by a receiver 1003 at a station B which is a second station opposing the station A, g(i) is a time-varying gain due to fading, and n(i) is an additive white Gaussian noise (AWGN).

For a bidirectional communications system, two sets of the system shown in FIG. 1A, which has reverse transmission directions, are included.

If the channel 1002 is a channel on which the fading of the link in the first direction (from the station A to the station B) correlates with that of the link in the second direction (from the station B to the station A), for example, a TDD (Time Division Duplex) channel, the following control operations are performed.

The channel estimating unit 1006 within the receiver 1003 at the station A on the second direction link estimates the power gain of the channel 1002, and notifies of the estimated channel information the demodulator/decoder unit 1007 within the receiver 1003 at the station A. The demodulator/decoder unit 1007 demodulates/decodes the received signal y(i) received from the second direction link after equlization based on the estimated channel information. Additionally, the channel estimating unit 1006 within the receiver 1003 at the station A notifies the adaptive modulator/encoder unit 1004 within the transmitter 1001 at the station A on the first direction link, of the estimated channel information (or the estimated information obtained by applying an extrapolation-interpolation to the estimated power gain). The adaptive modulator/encoder unit 1004 sets the modulation level information according to the notified estimated channel information, and sends the transmission signal x(i) along with the modulation level information to the first direction link on the channel 1002.

In this way, a reciprocating transmission of the modulation level information can be implemented.

In the meantime, if the channel 1002 is a channel on which the fading of the first direction link does not correlate with that of the second direction link, for example, an FDD (Frequency Division Duplex) channel, the following control operations are performed.

First of all, the channel estimating unit 1006 within the receiver 1003 at the station B on the first direction link estimates the power gain of the channel 1002, and notifies of the estimated channel information the demodulator/decoder unit 1007 within the receiver 1003 at the station B. The demodulator/decoder unit 1007 demodulates/decodes the received signal y(i) received from the first direction link after equlization based on the estimated channel information. Additionally, the channel estimating unit 1006 within the receiver 1003 at the station B feeds back its estimated channel information (or the estimated information obtained by applying an extrapolation-interpolation to the estimated power gain) to the adaptive modulator/encoder unit 1004 within the transmitter 1001 (shown in FIG. 1A) at the station A on the first direction link by using a feedback channel 1008 for the first direction link. The adaptive modulator/encoder unit 1004 sets the feedback modulation level information, and sends the transmission signal x(i) along with the modulation level information to the first direction link on the channel 1002.

Also the second direction link requires exactly the same feedback mechanism as that described above.

In FIG. 1A, a transmitting power control unit 1005 within the transmitter 1001 implements the above described power adaptation process.

FIG. 1B exemplifies the signal point arrangements implemented with respective modulation methods which can be selected by the adaptive modulator/encoder unit 1004 within the transmitter 1001 and the demodulator/decoder unit 1007 within the receiver 1003. As the modulation methods, QPSK (Quadri-Phase Shift Keying), 16QAM (16 Quadrature Amplitude Modulation), 64QAM, etc. can be selected.

Since the adaptive modulation method requires the processing unit for adaptively controlling a modulation method as described above, it has the trade-off between the performance and the complexity unlike the non-adaptive modulation method.

With the above described conventional adaptive modulation method, the modulation level information set by the adaptive modulator/encoder unit 1004 within the transmitter 1001 must be added as a control signal on the transmission signal x(i) sent by the transmitter 1001, as stated before. Therefore, the transmission efficiency degrades.

This control signal must be sent every state change period (such as every normalized maximum fading frequency). Because an error of the control signal causes the entire received information for one period (one block) to be lost, the error rate of the control signal must be decreased to a fairly low level. Accordingly, the conventional adaptive modulation method requires also the redundancy for correcting an error of the control signal.

Up to now, also the method for preventing the transmission efficiency from decreasing by embedding the modulation level information in the control signal (such as a preamble) used for another purpose, and (not by estimating but) by demodulating the control signal on a receiving side has been proposed. This method, however, imposes a restriction on the pattern of the control signal, which leads to a lack of generality and universality.

During such an adaptive modulation, shown as a in FIG. 1A, and when an adaptive power control is performed in such a way that the instantaneous Es/Nos, that is, BERs (bit error rate) become the same, the transmission efficiency of a single user is optimized. In this case, however, there is a problem in that with a cellular system, etc., inter-cell interference increases and the channel capacity significantly degrades.

Therefore, in a system, such as a cellular system, etc., where a high density of base stations is assumed, as shown as b in FIG. 1, a method for changing only a modulation level ML based on a channel power gain is effective. If such a method is adapted, averaged transmitting power (symbol $\bar{S}$ can been seen in FIG. 1) becomes constant regardless of the modulation level ML. In the previous application, Japanese Patent Application No. 10-070797, the maximum likelihood estimation is performed assuming that adaptive power control is employed. For this reason, the invention described in the previous application could not be applied to the method of changing only a modulation level ML based on a channel power gain.

SUMMARY OF THE INVENTION

The present invention was developed in the background described above, and an object of the present invention is to avoid the degradation of the transmission efficiency of signals without transmitting a control signal from a transmitting side, particularly by enabling the maximum likelihood estimation of the modulation level ML on a receiving side in an adaptive modulation method of changing a modulation level ML based on a channel power gain. Another object of the present invention is to enable this invention to be used in the system described above, where power adaptation is employed, without any problems.

The present invention assumes a radio transmission technology for adaptively changing a modulation level ML according to channel condition.

The first aspect of the present invention has the following configuration.

First, the squared error of the minimum value of distances between each of the signal points to be received at the modulation level ML and the signal point of a received signal is calculated at each modulation level ML.

The receiving power level of the received signal is measured.

Then, a value obtained by multiplying the squared error calculated at each modulation level ML by a weight calculated from both a threshold for switching a modulation level ML and the received power level, is calculated as a likelihood value at each modulation level ML.

Then, a modulation level ML corresponding to the maximum likelihood value of the likelihood values at the modulation levels MLs is estimated as the modulation level ML of the received signal.

The second aspect of the present invention has the following configuration.

First, the squared error of the minimum value of distances between each of the signal points to be received at the modulation level ML and the signal point of a received signal is calculated at each modulation level ML.

The average throughput of the received signal is measured.

Then, each of thresholds for switching the modulation levels MLs is changed based on the average throughput.

The received power level of the received signal is measured.

Then, a value obtained by multiplying the squared error calculated at each modulation level ML by a weight calculated from both a threshold for switching the modulation level ML and the received power level, is calculated as a likelihood value at each modulation level ML.

Then, a modulation level ML corresponding to the maximum likelihood value of the likelihood values at the modulation level ML is estimated as the modulation level ML of the received signal.

The third mode of the present invention has the following configuration.

First, the squared error of the minimum value of distances between each of the signal points to be received at the modulation level ML and the signal point of a received signal is calculated at each modulation level ML.

The received power level of the received signal is measured.

The average throughput of the received signal is measured.

Then, a value obtained by multiplying the squared error calculated at each modulation level ML by a weight calculated from both a threshold for switching the modulation level ML and the received power level, is calculated as a likelihood value at each modulation level ML.

Then, a modulation level ML corresponding to the maximum likelihood value of the likelihood values at the modulation levels MLs is estimated as the modulation level ML of the received signal.

According to the present invention, in either an adaptive modulation method for changing only a modulation level ML based on a channel power gain or an adaptive modulation method for performing a power adaptation in addition controlling the modulation level ML, the maximum likelihood value of a modulation level ML can be estimated on a receiving side by not transmitting a control signal to a transmitting side.

According to the present invention, in a channel condition in which the average throughput is not improved, communications in which the average throughput is maintained constant at the cost of the bit error rate can be realized.

BRIEF DESCRIPTION OF THE DRAWINGS

One skilled in the art can easily understand additional features and objects of this invention from the description of the preferred embodiments and some of the attached drawings. In the drawings:

FIG. 2 shows the system configuration of a preferred embodiment of the present invention.

DESCRIPTION OF THE PREFERRED EMBODIMENTS

Figure 1A:
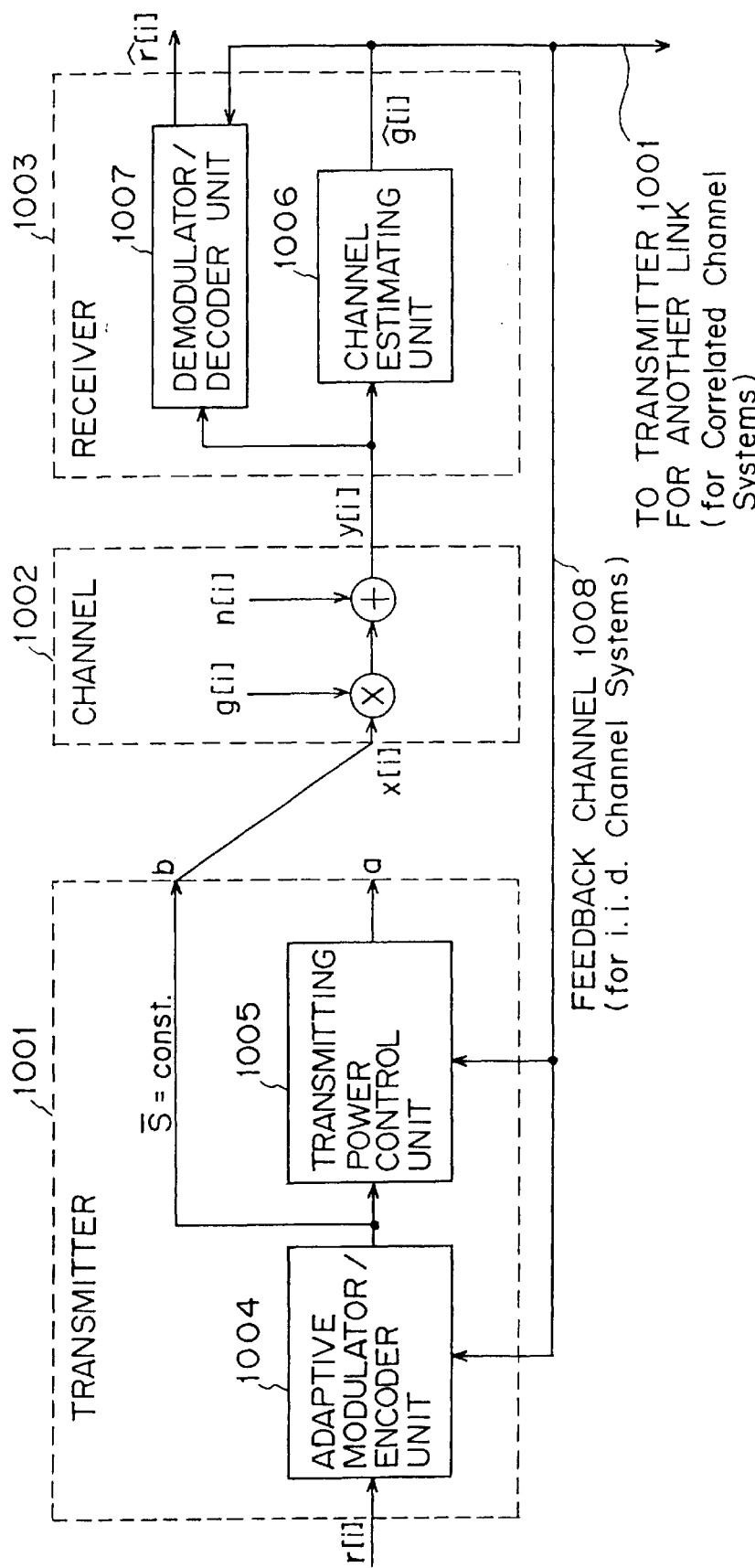
FIG. 1 explains the principle of an adaptive modulation method.

The preferred embodiments of the present invention are described below with reference to the drawings.

System Configuration of a Preferred Embodiment of the Present Invention

FIG. 2 shows the system configuration of a preferred embodiment of the present invention.

In this embodiment and in order to simplify, a TDD (time division duplex) system is targeted in which there is a correlation between the fading of a first direction (from station A (#A) to station B (#B)) link and the fading of a second direction (from station B to station A).

An adaptive modulator/encoder 104 of a transmitter 101 in station A executes encoding and modulation processes corresponding to a plurality of modulation levels MLs.

A modulation level decision unit 105 of the transmitter 101 in station A decides the modulation level ML of a signal to be transmitted, based on both an average received power $\gamma_r$ reported from a received power measurement unit 109 of a receiver 103 in station A and a threshold CNR $\gamma_{ML}$ at each modulation level ML, and reports it to a data selector 106 of the transmitter 101 in station A.

The data selector 106 of the transmitter 101 in station A selects a modulation signal among modulation signals at each of the modulation levels MLs outputted from the adaptive modulator/encoder 104 which corresponding to the modulation level ML reported from the modulation level decision unit 105, and transmits it to a correlation channel 102 as a transmitted signal for station B.

A pilot-symbol-assisted channel estimation unit 108 of the receiver 103 in station B (#B) estimates the power gain of the correlation channel 102 based on a pilot symbol, which is a known symbol, received over the correlation channel 102, and reports the calculated estimation information to a demodulator/decoder 107 of the receiver 103 in station B.

The demodulator/decoder 107 executes a demodulation/decoding process corresponding to each modulation level ML of the received signal based on the estimation information. At this time, the demodulator/decoder 107 calculates the squared error $d^2_{ML}$ of the minimum value of distances between data to be decoded in each process and a signal point to be received at the modulation level ML, in each demodulation /decoding process corresponding to each modulation level ML, and reports each $d^2_{ML}$ to a modulation level estimation unit 110 of the receiver 103 in station B.

The received power measurement unit 109 of the receiver 103 in station B measures an average received power $\gamma_r$ in each of the prescribed measuring sections of the received signal, and reports it to both the modulation level estimation unit 110 of the receiver 103 in station B and the modulation level decision unit 105 of the transmitter 101 in station B.

The modulation level estimation unit 110 of the receiver 103 in station B estimates the maximum likelihood value of the modulation level ML of the received signal, based on both a squared error $d^2_{ML}$ at each of the modulation levels MLs reported from the demodulator/decoder 107 and an average received power $\gamma_r$ reported from the received power measurement unit 109, and reports the estimation result to a data selector 111.

The data selector 111 of the receiver 103 in station B selects decoded data among the decoded data at the modulation levels MLs outputted from the demodulator/decoder 107 which corresponding to the modulation level ML reported from the modulation level estimation unit 110, and outputs it as a received signal.

The transmitter 101 in station B generates a signal to be transmitted to station A using the same operation that the transmitter 101 in station A uses, and transmits it to a correlation channel. At this time, the modulation level decision unit 105 of the transmitter 101 in station B determines the modulation level ML of the transmission signal, based on both an average received power $\gamma_r$ inputted from the received power measurement unit 109 of the receiver 103 in station B and a threshold CNR $\gamma_{ML}$ at each of the modulation levels MLs.

The receiver 103 in station A decodes the received signal used the same operation that the receiver 103 in station B uses. At this time, the received power measurement unit 109 of the receiver 103 in station A reports the average received power $\gamma_r$ measured for the received signal to the modulation level decision unit 105 of the transmitter 101 in station A.

In this way, bi-directional communications with a TDD can be implemented.

Figure 1B:
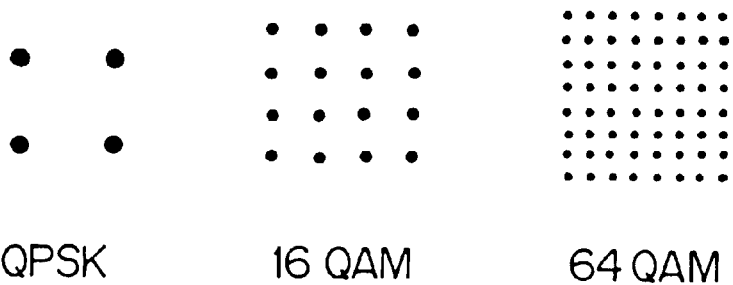

However, if a communication system where a channel with no correlation between fading in both directions is used, such as an FDD (frequency division duplex) system, there is no difference between a TDD system and an FDD system, since fading can be handled by providing a feedback channel in a form shown in FIG. 1.

Principle of the Present Invention

Before the detailed configuration and operation of the preferred embodiments of the present invention with the system configuration described above are described, the principles of the present invention are described.

(1) The present invention focuses attention on a difference in an average CNR (carrier-to-noise ratio) at each modulation level ML.

A square-QAM modulation method with a fixed symbol interval Ts is studied. An M-level modulation method where a modulation level ML=M has N signal points (N=$2^m$) and, implicitly, has a throughput of M bit/symbol. Each modulation method is assumed to have a Nyquist data pulse (B=1/Ts) such that an average Es/No equals an average SNR (signal-to-noise ratio). Assuming that in such a modulation method a fading compensation is made in the receiver 103 shown in FIG. 2, control of the modulation levels MLs based on the average CNR of the received signal is studied.

For example, in each of four modulation methods, that is, transmission-off (ML=0), QPSK (ML=2), 16QAM (ML=4) and 64QAM (ML=6), an average CNR is calculated as $\gamma_{QPSK}=\delta^2/\sigma_N^2$, $\gamma_{16QAM}=5\delta^2/\sigma_N^2$ and $\gamma_{64QAM}=21\delta^2/\sigma_N^2$, respectively, except in a transmission-off case. Here, $2\delta$ and $\sigma_N^2$ are the minimum distances between signal points (Euclidean distance) and a variance of an additive white Gaussian noise, respectively. The transmission-off mode is selected if a signal power or the average CNR of received signals is quite low. A theoretical averaged BER (bit error rate) in each modulation mode can be derived from this average CNR.

As clearly seen from an average CNR value at each modulation level ML described above, if the ratios of a distance between signal points to a noise are the same, that is, if the Es/Nos are the same and the average BERs are the same, average CNRs at each modulation level ML are not identical. Specifically, when the average CNR of received signals is observed, it is sufficient to conduct communications using a modulation method at a modulation level ML corresponding to the observed average CNR in order to maintain the BER performance larger than a certain target BER (or to maintain the BER performance at a certain target BER).

Figure 3:
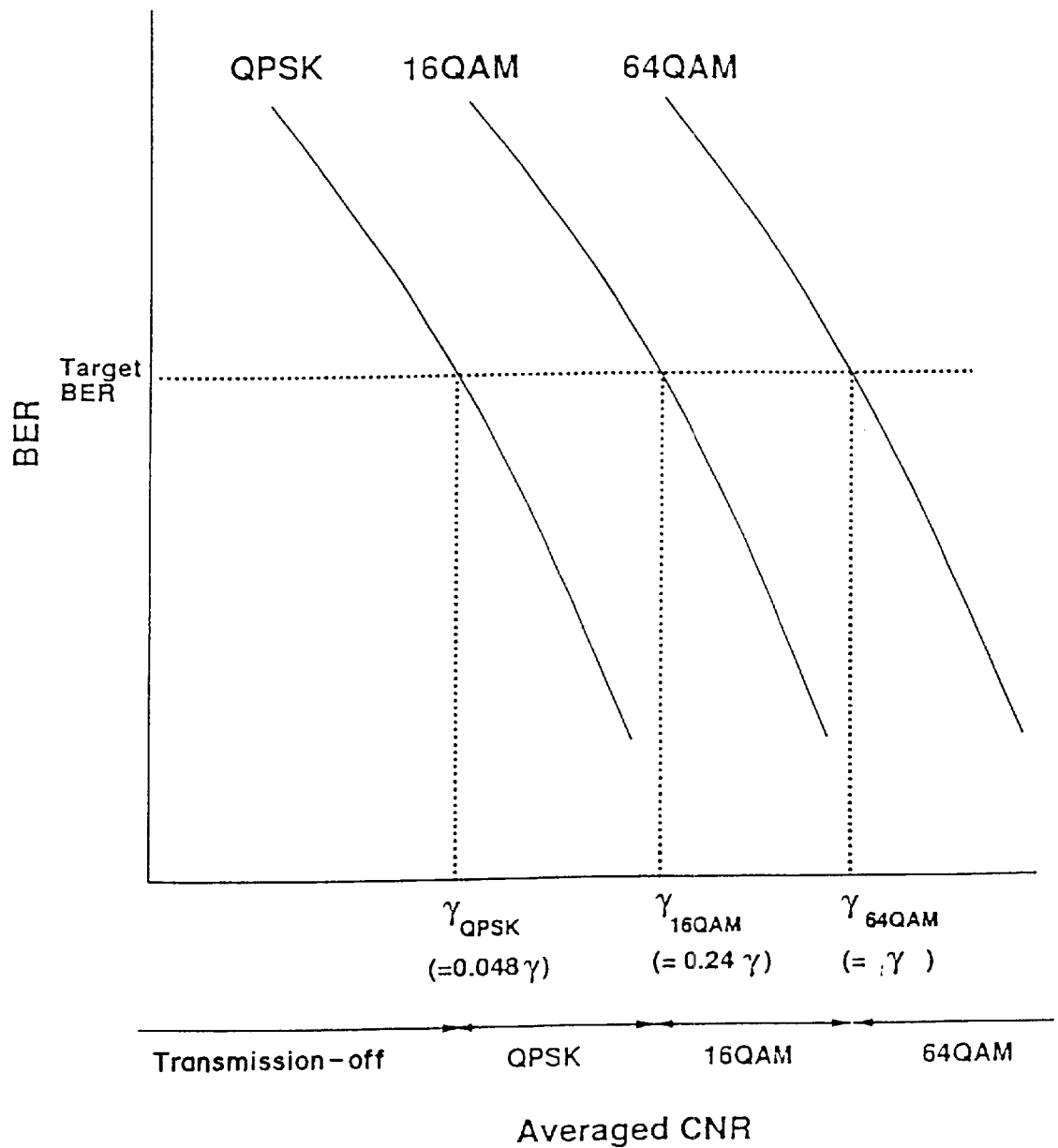
FIG. 3 shows an example of threshold CNR vs BER performances in the preferred embodiment of the present invention.

FIG. 3 shows an example of threshold CNR vs BER performances at each modulation level ML in the preferred embodiment of the present invention. As seen from FIG. 3, when a BER is fixed to an arbitrary target BER, a ratio of average CNRs between modulation methods, that is, a QPSK (ML=2), a 16QAM (ML=4) and a 64QAM (ML=6) becomes $\delta/\sigma_N^2$ vs $5\delta/\sigma_N^2$ vs $21\delta/\sigma_N^2 \approx 0.048$ vs $0.24$ vs $1$. Therefore, in order to maintain the BER of the channel larger than the target BER, first, for example, in a 64QAM modulation method the absolute value $\gamma$ of an average CNR $\gamma_{64QAM}$ such that the BER equals the target BER, is calculated, and this absolute value $\gamma$ is designated to be the threshold of an averaged CNR for switching over a 64QAM modulation method and a 16QAM modulation method (threshold CNR $\gamma_{64QAM}$). Then, an absolute value $0.24\gamma$ obtained by multiplying the switching CNR $\gamma_{64QAM}=\gamma$ by 0.24 is designated to be the threshold of an average CNR for switching over a 16QAM modulation method and a QPSK modulation method (threshold CNR $\gamma_{16QAM}$). Furthermore, an absolute value $0.048\gamma$ obtained by multiplying the switching CNR $\gamma_{64QAM}=\gamma$ by 0.048 is designated to be the threshold of an average CNR for switching over a QPSK modulation method and a transmission-off mode (threshold CNR $\gamma_{QPSK}$) For example, by using three threshold CNRS $\gamma$, $0.24\gamma$ and $0.048\gamma$ obtained in this way, the following control is implemented at transmission. First, an average CNR at a receiver is observed. Then, if the observed average CNR is higher than $\gamma$, a transmission by a 64QAM modulation method is employed. If the observed average CNR is between threshold CNRs $0.24\gamma$ and $\gamma$, a transmission by a 16QAM modulation method is employed. If the observed average CNR is between threshold CNRs $0.048\gamma$ and $0.24\gamma$, a transmission by a QPSK modulation method is employed. If the observed average CNR is lower than a threshold CNR $0.048\gamma$, a transmission is turned off, according to the system regulations, or a transmission by a QPSK modulation method is employed.

When the adaptive modulation controlling operation described above is applied to a TDD system, first an average CNR is observed by a received power measurement unit 109 in each receiver 103 as the observing operation of an average received power $\gamma_r$. The observation result is obtained by a modulation level decision unit 105 in each transmitter 101 and a modulation level ML is also decided by the modulation level decision unit 105 in each transmitter 101 based on a threshold CNR $\gamma_{ML}$ at each modulation level ML.

With such a transmitting method, a control that sets the average transmitted power of a generated signal to a predetermined value is incorporated in each of the dynamically selected modulation methods described above. In the example shown in FIG. 2, the control is incorporated in an adaptive modulator/encoder 104 of each transmitter 104.

By changing in this way only a modulation level ML based on a channel gain, this adaptive modulation method can be applied to a system, such as a cellular system, etc., where base stations are in close proximity. Since not only a CNR, but also another signal power standard can also be applied by using a simple conversion equation, an Eb/No, Es/No, SNR, etc., can also used as a received power.

A pilot-symbol-assisted estimation technique is widely known as a compensation method for received level variations due to fading (for example, g(i) in FIG. 1). Coherent phase detection can be achieved by using this technique in a fading by embetting pilot symbols in transmitted signals at intervals shorter than the Nyquist interval of a maximum fading frequency. Although the lost signal power can never be recovered by using any techniques, the relative values in an amplitude modulation method can be compensated by using this technique. Specifically, if a pilot symbol is designated to be a signal point with the maximum amplitude, only the relative position of a transmission signal point for the maximum amplitude can be compensated.

As coherent phase can be detected by a fading compensation, the data has both amplitude information and a noise corresponding to the instantaneous SNR. Then, the accumulated squared error $d^2_{ML}$ of the distance for appropriate symbols (L symbols) between each received signal and nearest signal point to be received at the modulation level ML is calculated in each demodulation/decoding process corresponding to each modulation level ML.

$$d^2_{ML} = \sum_{i}^{L} [r(i) - r^{ML}_{min}(i)] \quad (1)$$

Figure 4:
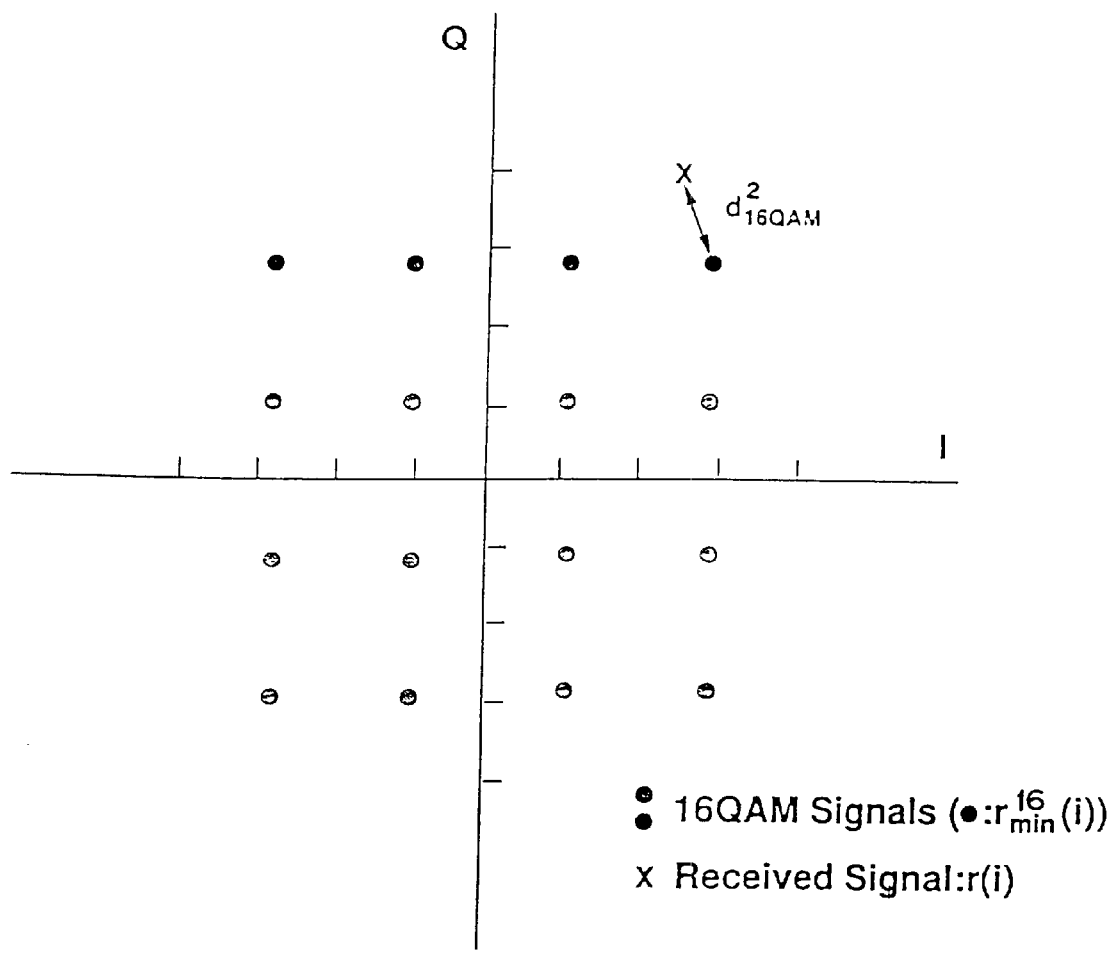
FIG. 4 explains distances between signal points (16QAM).

FIG. 4 shows diagrams of the principle of the squared error $d^2_{ML}$ described above in a 16QAM modulation method. The value being subtracted (the second term) on the right-hand side of equation (1) is the value of the signal nearest to the actually received signal point r(i) of signal points to be received at the modulation level ML.

Under the condition that the average power of signals to be transmitted is constant, as described earlier, when the received signal is demodulated at the same level as in is on the transmitting side corresponding to the received signal, the squared error $d^2_{ML}$ at the modulation level ML calculated according to equation (1) should theoretically be 0 (if the noise is 0). However, if the received signal is demodulated at a modulation level ML different from that of the transmitting side corresponding to the received signal, the squared error $d^2_{ML}$ at the modulation level ML should have some offset with a variance.

Therefore, it is appropriate that the squared error $d^2_{ML}$ calculated according to equation (1) in each demodulation/decoding process at each modulation level ML is used to estimate a modulation level ML on a receiving side. Qualitatively, a modulation level ML corresponding to the minimum value of the squared error $d^2_{ML}$ calculated according to equation (1) in each demodulation/decoding process at each modulation level ML is a modulation level ML estimated on the receiving side.

As described earlier, on a transmitting side modulation levels MLs are switched based on the average received CNR at a receiving side. Therefore, by applying a weighting to a received level, more accurate information should be able to be obtained. In the present invention, since, as described earlier, a threshold CNR $\gamma_{ML}$ for switching modulation levels MLs has a relatively constant ratio, if as described earlier, a reference (for example, the absolute value $\gamma$) is determined, the relative values (for example, $0.24\gamma/0.048\gamma$ described earlier) can be determined uniquely.

Taking into consideration these points, the likelihood function for each modulation level ML is defined as follows.

$$\lambda = f(\gamma_{ML}, \hat{\gamma}_r) * d_{ML}^2 \quad (2)$$

where $f(\gamma_{ML}, \gamma_r)$ is a weighting function and is proportional to a distance between a threshold CNR $\gamma_{ML}$ at each modulation level ML and an average received power $\hat{\gamma}_r$ of the measuring duration (L symbol duration) of received data. This function yields a reliability. An asterisk "*" denoted an operator. One example of an operator is multiplication. Since a likelihood function $\lambda_{ML}$ can also be used for a relative value comparison, the weighting function $F(\gamma_{ML}, \hat{\gamma}_r)$ can be a constant value in a specific modulation method. Qualitatively, this weighting function $f(\gamma_{ML}, \hat{\gamma}_r)$ works in such a way that the lower an SNR, the lower the modulation level ML; and the higher the SNR, the higher the modulation level ML.

As described above, in the present invention, a modulation level ML corresponding to the maximum likelihood value of likelihood functions $\lambda_{ML}$S corresponding to the modulation level ML is used as an estimated result of a receiving side.

The maximum likelihood estimation method described above is effective not only for an adaptive modulation method for changing only a modulation level ML based on a channel power gain (or a rate adaptation), but also for an adaptive modulation method for both a power adaptation and a rate adaptation. In this case, the weighting function $f(\gamma_{ML}, \hat{\gamma}_r)$ of equation (2) works effectively (since equation (1) is the same for all MLs).

(2) Maintaining an average throughput constant is an essential factor in a communication system. For example, in a CBR (constant bit rate) service, etc., of an ATM (asynchronous transfer mode) communication method, maintaining an average throughput constant is an absolute requirement. The adaptive modulation method performs a rate adaptation to provide a modulation level ML suitable for the channel condition in order to maintain channel quality to be constant.

Particularly, in the case of an adaptive modulation method of performing an adaptive control according to the change of an instantaneous value, although a constant BER/variable rate can be achieved instantaneously (or in a short term), there is no guarantee against variation for a long term. Therefore, a constant BER/constant rate is implemented by controlling the transmission power so that an average received power can be maintained constant over a long duration (a plurality of blocks). Although this transmission power control does not increase interference as much as transmission power control following an instantaneous value (see FIG. 2), there remains a certain amount of interference. This is especially true for the average received power of mobile terminals on the edge of a cell because the transmission power of these terminals is fairly large.

Even in the case of the above described instantaneous adaptive control is taken into account, an adaptive control system in which a variable BER/constant rate can be implemented over a long duration can be considered reasonably. This is a system in which there is no transmission power control. Although this does not guarantee a constant average BER over a long duration, a constant average throughput (transmission rate) is guaranteed. For example, although this system does not guarantee a required BER for mobile terminals on the edge of a cell, the transmission rate is controlled and maintained at a constant value specified in the system. To be more specific, this system measures an average throughput on a transmitting side for a correlation channel, and measures it on a receiving side for a non-correlation channel. Then, when the average throughput is below than a certain threshold, (a) the instantaneous throughput is increased (the instantaneous BER increases) by shifting each threshold CNR upward or (b) the modulation level ML is not changed, even if a received signal level is lower than a threshold CNR.

Here, the control method (a) is studied. First, since the same average throughput measuring algorithm is implemented on both a transmitting side and on a receiving side where a modulation level ML is estimated, a control in which the same threshold CNR is used for each block on both the transmitting side and on the receiving side is performed. Since the same criterion is applied to both the transmitting side and the receiving side. Information does not need to be transmitted on a threshold CNR for each block because of a known parameter. The likelihood function $\lambda_{ML}$ at each modulation level ML, expressed by equation (2), is modified as follows.

$$\lambda = f(\gamma_{ML}(blk(i)), \hat{\gamma}_r) * d_{ML}^2 \quad (3)$$

where a threshold CNR at each modulation level ML, $\gamma_{ML}(blk(i))$ is the threshold CNR of the i-th block which is given to maintain an average throughput constant.

(3) In the above (2), a control in which the same threshold CNR is used for each block both on a transmitting side and a receiving side is performed. Here, although the same average throughput measuring algorithm as that on the transmitting side is implemented on the receiving side, as in (2), the threshold CNR at each modulation level ML $\gamma_{ML}$ is not changed for each block, and the weighting based on an average throughput to be measured on the receiving side is given to the likelihood function $\lambda_{ML}$ at each modulation level ML expressed by equation (2). Thus, the likelihood function $\lambda_{ML}$ at each modulation level ML given by equation (2) is modified as follows.

$$\lambda = \kappa(blk(i), ML) * f(\gamma_{ML}, \hat{\gamma}_r) * d_{ML}^2 \tag{4}$$

where $\kappa(blk(i), ML)$ is a weighting function for the i-th block for maintaining a currently used modulation level ML in order to maintain an average throughput constant. In other words, a weighting factor works in such a way that the likelihood of the used modulation level ML increases.

For example, when an average throughput is maintained constant, the weighting function is as follows.

$$\kappa(blk(i), ML) = 1 \text{ (for all ML)} \tag{5}$$

However, when an average throughput is not maintained constant, the weighting function for the currently used modulation level, or that for higher modulation levels than the used modulation level in the condition that a higher modulation level can be set against to the channel condition, is given as follows.

$$\kappa(blk(i), ML) \ll 1 \text{ (for a certain ML)} \tag{6}$$

Since the value of the likelihood function $\lambda_{ML}$ decreases as the likelihood increases, according to equation (6), it is probable that the currently used modulation level ML or a modulation level ML higher than it will be selected.

Figure 5:
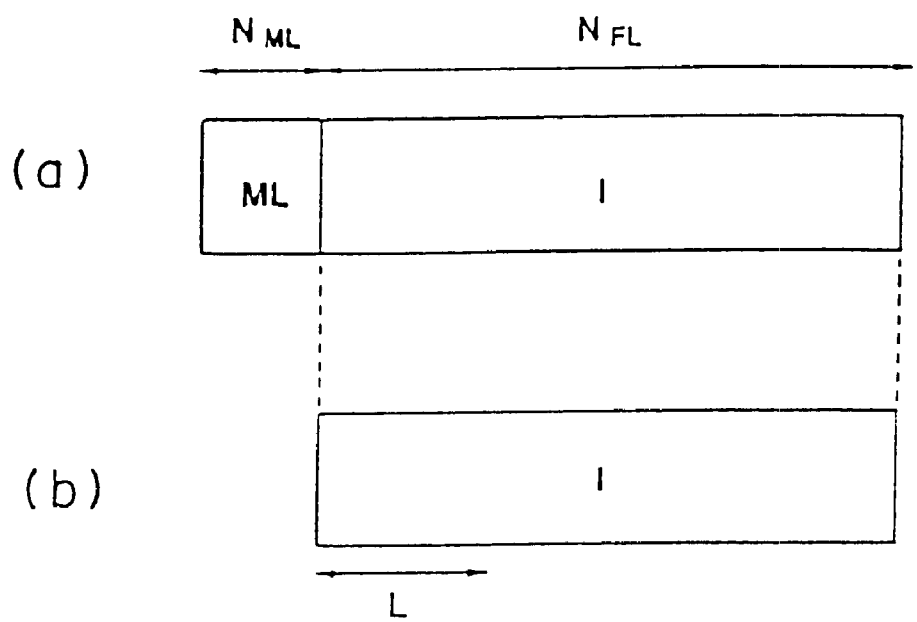
FIG. 5 shows transmission formats.

FIG. 5 compares the conventional method and the transmission format of the present invention on a transmitting side. A control signal for fading compensation, etc., is not included. It is assumed here that the estimation symbol length and the frame length are L and $N_{FL}$, respectively, and that $N_{FL} \leq L$. Furthermore, in the format of the conventional method, shown in FIG. 5A, the modulation level control signal of data length $N_{ML}$ is interpolated for each duration to change a modulation level ML (for example, a normalization fading frequency) in addition to the information signal of the frame length $N_{FL}$. However, the present invention doesn't use this modulation level control signal, and only the information signal of the frame length $N_{FL}$ modulated at a modulation level ML corresponding to a channel condition is transmitted. According to the present invention, a modulation level ML can be estimated on a receiving side from the information signal based on the likelihood function $\lambda_{ML}$ defined by equations (2), (3) and (4), and data can be decoded without a reference signal.

Each of the preferred embodiments of the present invention based on the operation principle described above is described.

First Preferred Embodiment of the Present Invention

Figure 6:
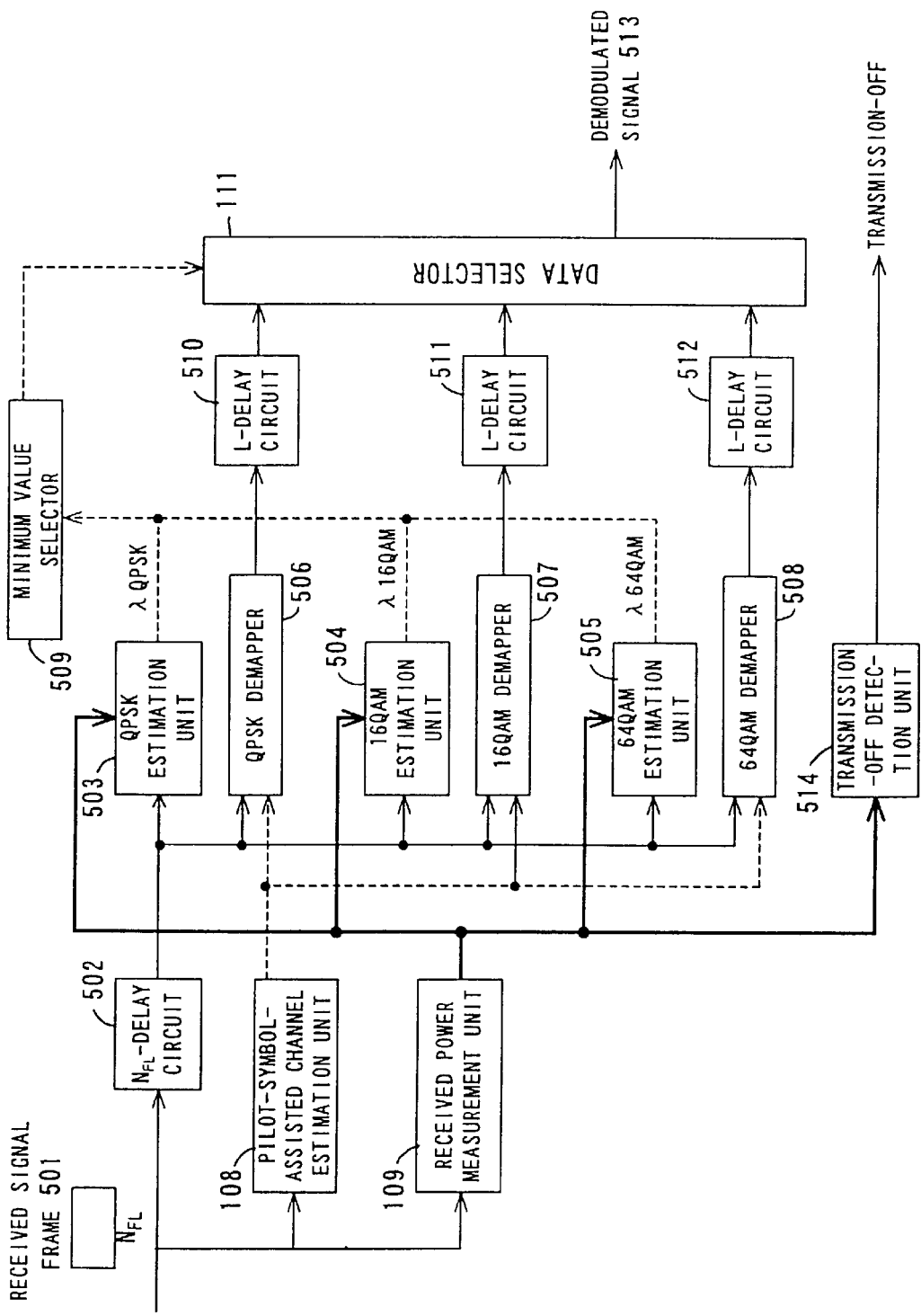
FIG. 6 shows the configuration of a first preferred embodiment of the estimation unit.

FIG. 6 shows the configuration of the first preferred embodiment of the receiver 103 shown in FIG. 2. Components referred to in FIG. 6 using the same identification numbers used in FIG. 2 also have the same functions.

First, a QPSK demapper 506, a 16QAM demappers 507 and a 64QAM demapper 508 execute demodulation/decoding processes at each of modulation levels ML=2, 4 and 6 corresponding to each demapper for a received signal frame 501 of each frame length $N_{FL}$ (see FIG. 5B) received through a $N_{FL}$ delay circuit 502. Temporarily store each L symbol portion (see FIG. 5B) of each demodulated data of the frame length $N_{FL}$ in L delay circuits 510, 511 and 512. These delay circuits, 510 through 512, are circuits for adjusting an L symbol portion of a delay required for the estimation process at a modulation level ML when estimation units 503 through 505, described next.

Then, a QPSK estimation unit 503, a 16QAM estimation unit 504 and a 64QAM estimation unit 505 calculate likelihood functions $\lambda_{QPSK}$, $\lambda_{16QAM}$ and $\lambda_{64QAM}$ at modulation levels ML=2, 4 and 6 corresponding to each estimation unit for each L symbol portion (see FIG. 5B) of the received signal frame 501 received through the $N_{FL}$ delay circuit 502 according to equation (2).

Then, a minimum value selector 509 selects a likelihood function with the minimum value of likelihood functions $\lambda_{QPSK}$, $\lambda_{16QAM}$ and $\lambda_{64QAM}$, and has data selector 111 output the output of an L delay circuit (any one of units 510 through 512) corresponding to the minimum value as a demodulated signal 513.

When an average received power $\Gamma_r=0$ (or an approximation of it) is reported by a received power measuring implement 109, a transmission-off detection unit 514 detects a transmission-off.

Here, the detailed calculating operations of each of the likelihood functions, $\lambda_{QPSK}$, $\lambda_{16QAM}$ and $\lambda_{64QAM}$, according to equation (2) in the QPSK estimation unit 503, 16QAM estimation unit 504 and 64QAM estimation unit 505 are described.

First, squared errors, $d^2_{ML} = d^2_{QPSK}$, $d^2_{16QAM}$ and $d^2_{64QM}$ in equation (2), can be calculated in the process demodulating operation process from the QPSK demapper 506, 16QAM demapper 507 and 64QAM demapper 508.

Then, the received power measurement unit 109 in the receiver 103 shown in FIG. 2 calculates the average CNR equals the average received power $\hat{\gamma}_r$ in equation (2) for calculating each weighting function $f(\gamma_{ML}, \hat{\gamma}_r)$ using the following equation.

$$\hat{\gamma}_r = \sum_{i}^{N_{FL}} \frac{\hat{\gamma}_r(i)}{N_{FL}} \tag{7}$$

where $\hat{\gamma}_r(i)$ is the instantaneous value of the received power of each symbol in a frame with frame length $N_{FL}$.

Then, from weighting functions $f(\gamma_{ML}, \hat{\gamma}_r) = f(\gamma_{QPSK}, \hat{\gamma}_r)$, $f(\gamma_{16QAM}, \hat{\gamma}_r)$ and $f(\gamma_{64QAM}, \hat{\gamma}_r)$ in equation (2), a good estimation performance of a modulation level ML can be obtained according to equations (8) through (10) and by defining a join operator as a multiplication operator.

$$f(\gamma_{QPSK}, \hat{\gamma}_r) = \alpha \frac{\hat{\gamma}_r}{\gamma} \tag{8}$$

$$f(\gamma_{16QAM}, \hat{\gamma}_r) = 1 \tag{9}$$

$$f(\gamma_{64QAM}, \hat{\gamma}_r) = 1 + \frac{\beta_\gamma}{\hat{\gamma}_r}, \tag{10}$$

where $\gamma$ is the maximum value of a threshold CNR, that is, the absolute value of $\gamma_{64QAM}$.

As a result, the QPSK estimation unit 503, 16QAM estimation unit 540 and 64QAM estimation unit 505 can calculate likelihood functions $\lambda_{QPSK}$, $\lambda_{16QAM}$ and $\lambda_{64QAM}$ based on an average received power $\gamma_r$ reported from the received power measurement unit in the receiver 103 (equation (7)) and equations (11) through (13) obtained from equations (8) through (10) and equation (2).

$$\lambda_{QPSK} = \alpha \frac{\hat{\gamma}_r}{\gamma} d^2_{QPSK} \tag{11}$$

$$\lambda_{16QAM} = d^2_{16QAM} \tag{12}$$

$$\lambda_{64QAM} = 1 + \frac{\beta_\gamma}{\hat{\gamma}_r} d^2_{64QAM} \tag{13}$$

It is seen from the equations above that in this preferred embodiment, each likelihood function can be calculated without measuring a noise level. For example, it can be measured from only a received signal strength indicator (RSSI).

For example, if $(\hat{\gamma}_r/\gamma) \geq 1$ the likelihood function is 64QAM (ML=6); if $1 > (\hat{\gamma}_r/\gamma) \geq 0.24$, the likelihood function is 16QAM (ML=4); if $0.24 > (\hat{\gamma}_r/\gamma) \geq 0.048$, the likelihood function is QPSK (ML=2); if $0.048 > (\hat{\gamma}_r/\gamma)$, the transmission is turned off. In these cases, the modulation level ML has favorable performances when $\alpha = 0.6$ and $\beta = 8.0$.

Furthermore, when the threshold CNR is set to a value that is 2 dB less (×0.6), and if $(\hat{\gamma}_r/\gamma) \geq 0.6$, the likelihood function is 64QAM, and if $0.6 > (\hat{\gamma}_r/\gamma) \geq 0.14$, the likelihood function is 16QAM (ML=4), if $0.14 > (\hat{\gamma}_r/\gamma) \geq 0.029$, the likelihood function is QPSK (ML=2), and if $0.029 > (\hat{\gamma}_r/\gamma)$, the transmission is turned off. In these cases, the modulation level ML shows a favorable performances when $\alpha = 0.6/0.6 = 1.0$ and $\beta = 8.0 \times 0.6 = 4.8$, as in the cases above.

If the average noise levels of both the transmission and reception are the same, it is clear that since a measurement symbol duration can be adequately taken over a long duration (for example, the above frame length $N_{FL}$), the ratio of a threshold level to a received signal level $(\hat{\gamma}_r/\gamma)$ is the same as an estimated average channel gain $(\hat{g}_{FL})$ in one block, as given in equation (14). Therefore, if an estimated channel gain $(\hat{g}(i))$ can be obtained a certain method, the modulation level ML can be substituted by the following equation.

$$\hat{g}_{FL} = \sum_i^{N_{FL}} \frac{\hat{g}(i)}{N_{FL}} = \frac{\hat{\gamma}_r}{\gamma} \tag{14}$$

If the average received power in a duration longer than a variation is constant when an instantaneous value varies, it is also clear that an average throughput can be maintained constant by setting threshold values (relative and fixed value) corresponding to the average received power, but only when the received signal level variations can be regulated by some probability density distribution.

Here, a simulation is assumed for a Rayleigh fading channel. Although in a practical system, path loss or a shadowing is superposed, these factors can be omitted since the estimation method of a modulation level ML, according to this preferred embodiment, only follows a received signal level.

Figure 7:
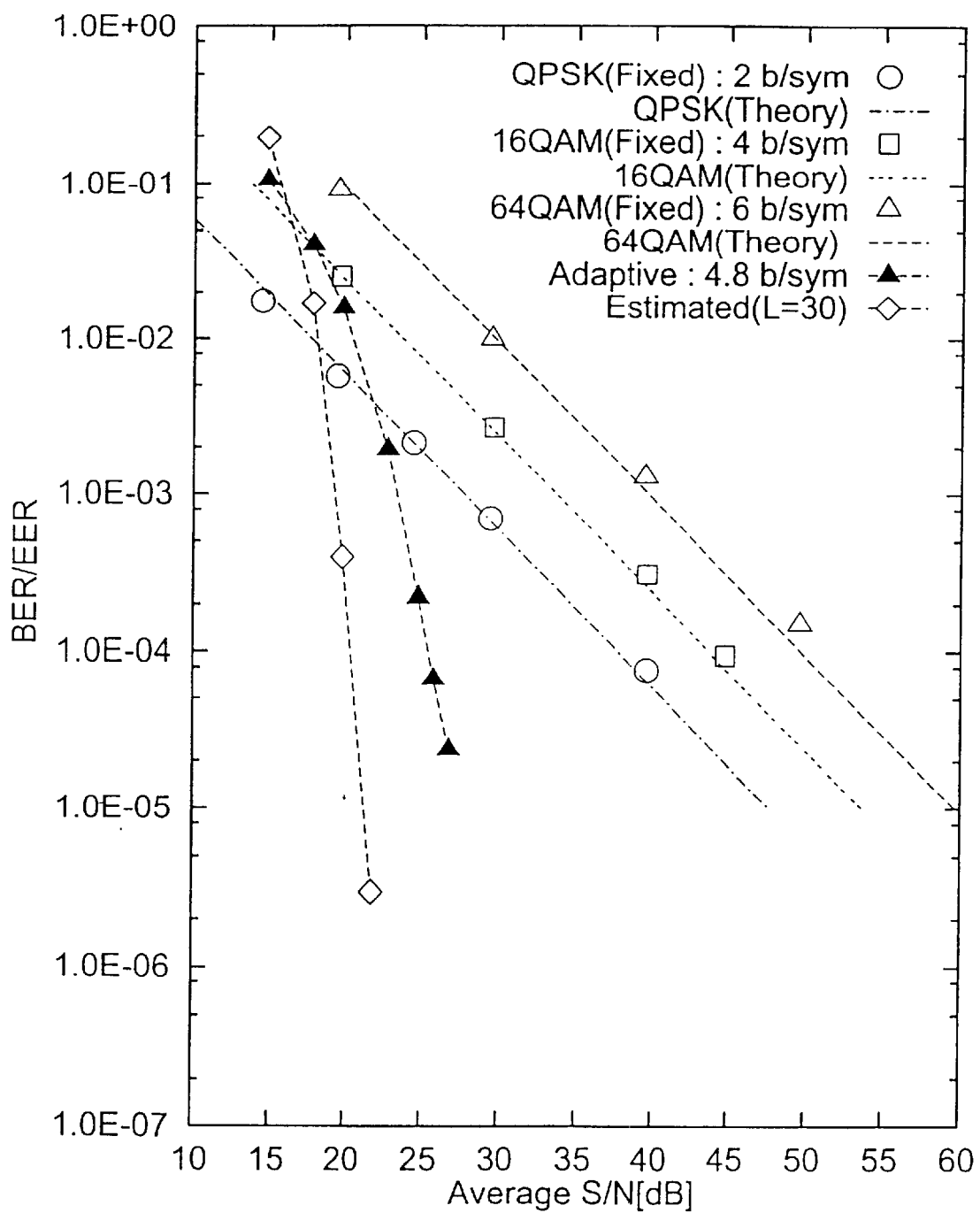
FIG. 7 explains the performances of the preferred embodiment of the present invention (fdts=0.001).

FIG. 7 shows both an estimation error rate (EER) performance and a bit error rate performance in an effective block assuming that $\alpha = 1.0$, $\beta = 5.0$, a maximum threshold CNR/average power $(\overline{S})$ ratio of 0.6, an average throughput of 4.8 bit/symbol in the following case:

Modulation method: transmission-off/QPSK/16QAM/64QAM

Number of measurement symbols: 30

Normalization fading frequency (fdTs): 0.001

Figure 8:
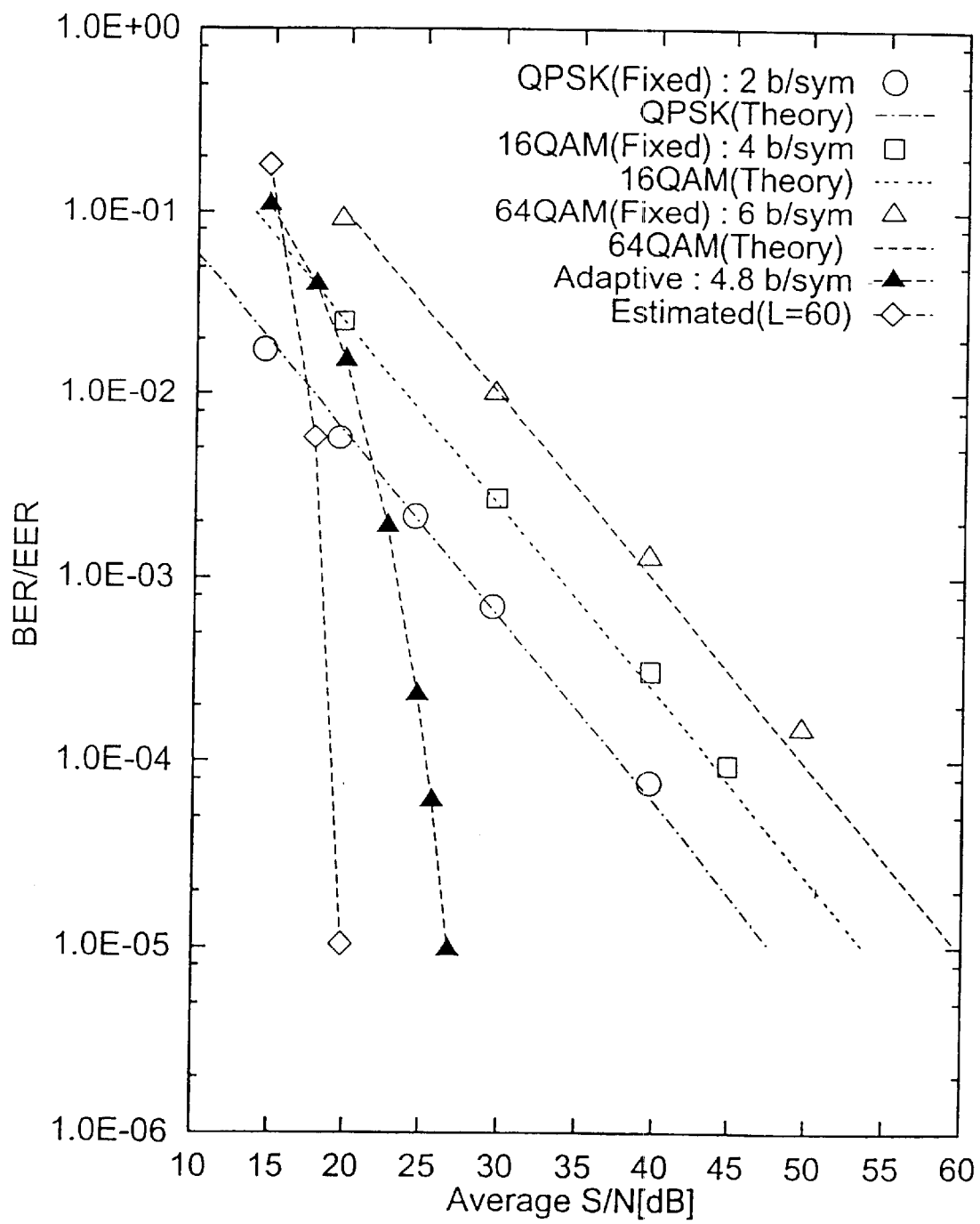
FIG. 8 explains the performances of the preferred embodiment of the present invention (fdts=0.000125).

FIG. 8 shows both an estimation error rate (EER) performance and a bit error rate performance in an effective block assuming that $\alpha = 1.0$, $\beta = 5.0$, a maximum threshold CNR/average power $(\overline{S})$ ratio of 0.6, an averaged throughput of 4.8 bit/symbol in the following case:

Modulation method: transmission-off/QPSK/16QAM/64QAM

Number of measurement symbols: 60

Normalizing fading cycle (fdTs): 0.000125

As clearly seen from these diagrams, an estimation accuracy with a low CNR satisfying BER=$10^{-2}$ which is higher in quality by more than three digits in an SNR and is 5 dB or more greater in an SNR ratio for information bits, was obtained. This means that a frame error rate (FER) due to an estimation error has no influence on the BER of information signals in the case of a frame of $N_{FL} = 1000$ bits. Considering that with the approximately conventional method where modulation level signals are transmitted using control bits, a considerable degree of redundancy is required and a significant reduction of transmission efficiency cannot be avoided, it is clear that a system conforming to this preferred embodiment is superior. For example, even when control signals are regularly transmitted in a QPSK which provides a channel with the highest quality in an SNR, under the conditions described above, the channel quality must be improved by 10 dB or more. Implementation causes an increase in redundancy, and thereby implementation becomes unpracticable even if error correction is performed.

Second Preferred Embodiment of the Present Invention

Figure 9:
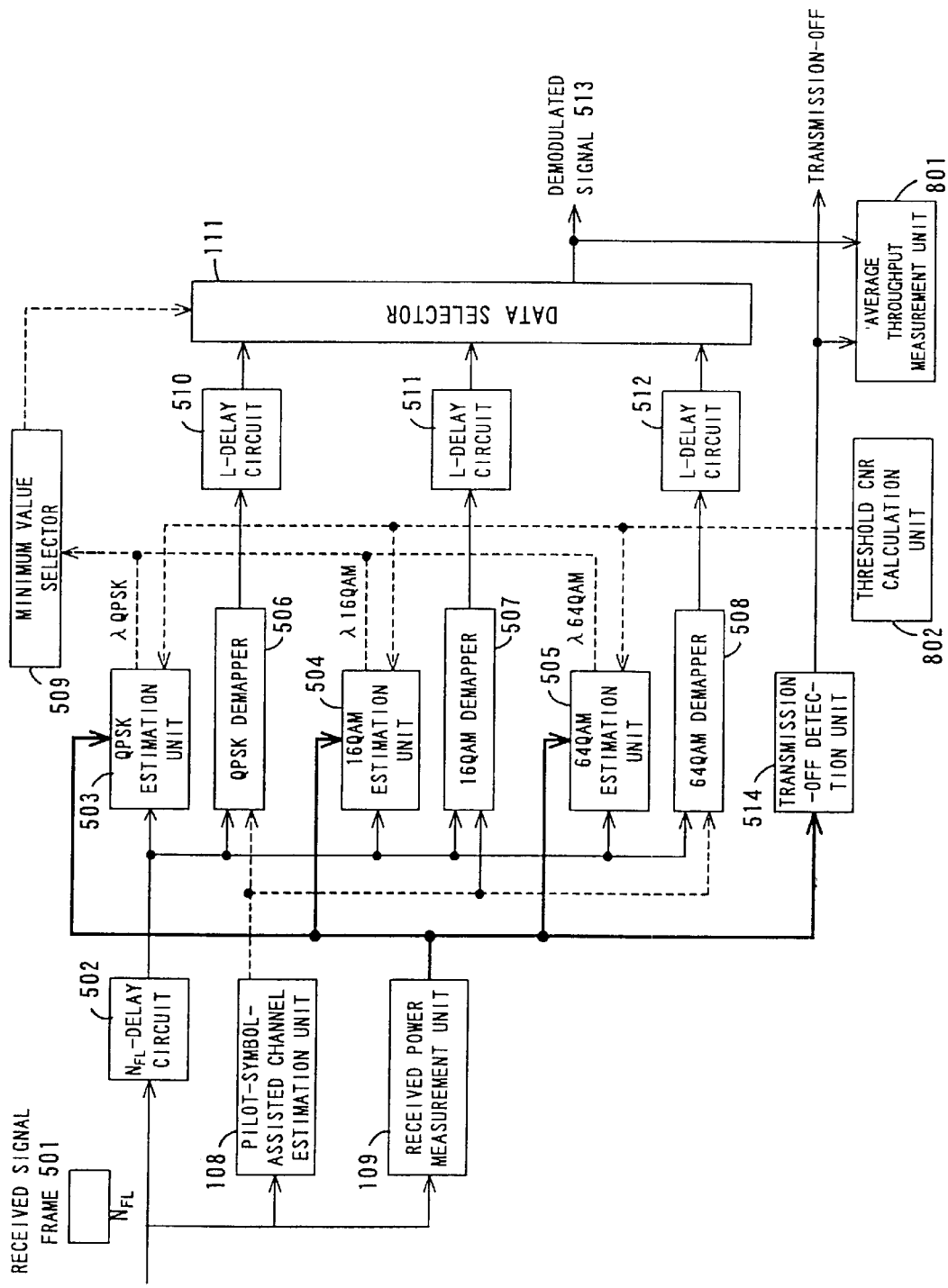
FIG. 9 shows the configuration of a second preferred embodiment of the receiver.

FIG. 9 shows the configuration of the second preferred embodiment of the receiver 103 in the system shown in FIG. 2. Components referred to in FIG. 9 using the same identification numbers used in FIG. 6 also have the same functions.

In the configuration shown in FIG. 9, a QPSK estimation unit 503, a 16QAM estimation unit 504 and a 64QAM estimation unit 505 implement the calculation of each of the likelihood functions, $\lambda_{QPSK}$, $\lambda_{16QAM}$ and $\lambda_{64QAM}$, based on equation (3).

In FIG. 9, an average throughput measuring instrument 801 calculates an average throughput for each prescribed block blk(i), based on both a received signal 513 outputted from a data selector 111 and a transmission-off signal outputted from a transmission-off detection unit 514, and reports the arranged to a threshold CNR calculation unit 802.

The threshold CNR calculation unit 802 reports each of the threshold CNRs, $\gamma_{ML}(blk(i)) = \gamma_{QPSK}(blk(i))$, $\gamma_{16QAM}(blk(i))$ and $\gamma_{64QAM}(blk(i))$ corresponding to the average throughput reported for each block blk(i), to the QPSK estimation unit 503, 16QAM estimation unit 504 and 64QAM estimation unit 505, respectively.

Each of estimation units 503 through 505, for example, calculates each of the likelihood functions $\lambda_{QPSK}$, $\lambda_{16QAM}$ and $\lambda_{64QAM}$, based on equations (11) through (13), respectively. In this case, information reported from the threshold CNR calculation unit 802 to the QPSK estimation unit 503, 16QAM estimation unit 504 and 64QAM estimation unit 505 consists of only the absolute value $\gamma(blk(i))$ corresponding to the average throughput reported for each block blk(i).

Third Preferred Embodiment of the Present Invention

Figure 10:
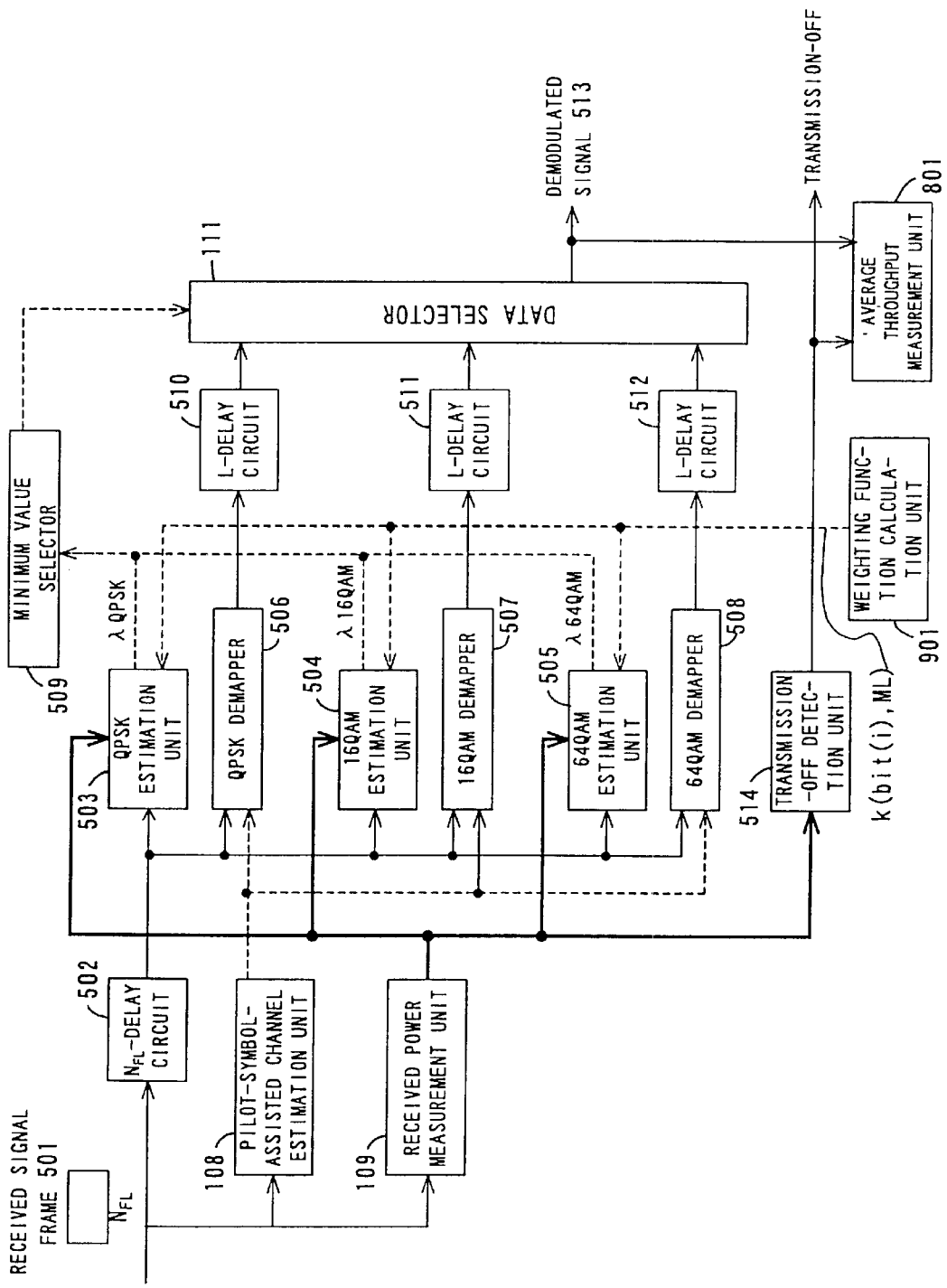
FIG. 10 shows the configuration of a third preferred embodiment of the receiver.

FIG. 10 shows the configuration of the third preferred embodiment of the receiver 103 in the system shown in FIG.

2. Components referred to in FIG. 10 using the same identification numbers used in FIG. 6 relating to the first preferred embodiment of the present invention, or in FIG. 9 relating to the second preferred embodiment of the present invention also have the same functions.

In the configuration shown in FIG. 10, a QPSK estimation unit 503, a 16QAM estimation unit 504 and a 64QAM estimation unit 505 implement the calculation of each of the likelihood functions, $\lambda_{QPSK}$, $\lambda_{16QAM}$ and $\lambda_{64QAM}$, based on equation (4).

In FIG. 10, an average throughput measuring instrument 801 calculates an average throughput for each prescribed block blk(i), based on both the received signal 513 outputted from the data selector 111 and a transmission-off signal outputted from the transmission-off detection unit 514, and reports throughput to a weighting function calculation unit 901.

The weighting function calculation unit 901 reports each of the weighted functions, K(blk(i), ML)=K(blk(i), QPSK), κ(blk(i), 16QAM) and κ(blk(i), 64QAM) corresponding to an average throughput reported for each block blk(i) to the QPSK estimation unit 503, 16QAM estimation unit 504 and 64QAM estimation unit 505, respectively.

Each of estimation units 503 through 505, for example, calculates each of the likelihood functions $\lambda_{QPSK}$, $\lambda_{16QAM}$ and $\lambda_{64QAM}$, respectively, by multiplying each of the right-hand side of equations (11) through (13) by each of the weighted functions described above.

What is claimed is:

1. A radio transmission method for flexibly controlling a modulation level according to conditions of transmission paths, comprising the steps of:

calculating a square error of a minimum value of distances between each signal point to be received at a modulation level and a signal point of a received signal for each modulation level;

measuring a received power level of a received signal;

calculating a value obtained by multiplying a square error calculated at each modulation level by a weighted calculation from both a threshold power level for switching a modulation level and a received power level as a likelihood value at each modulation level; and estimating a modulation level corresponding to a maximum likelihood value of all the likelihood values at each modulation level.

2. A radio transmission method for flexibly controlling a modulation level according to conditions of transmission paths, comprising the steps of:

calculating a square error of a minimum value of distances between each signal point to be received at a modulation level and a signal point of a received signal for each modulation level;

measuring an average throughput of a received signal;

changing each threshold power level for switching each modulation level, based on the average throughput;

measuring a received power level of a received signal;

calculating a value obtained by multiplying a square error calculated at each modulation level by a weighted calculation from both a threshold power level for switching a modulation level and a received power level as a likelihood value at each modulation level; and estimating a modulation level corresponding to a maximum likelihood value of all the likelihood values at each modulation level.

3. A radio transmission method for flexibly controlling a modulation level according to conditions of transmission paths, comprising the steps of:

calculating a square error of a minimum value of distances between each signal point to be received at a modulation level and a signal point of a received signal for each modulation level;

measuring a received power level of a received signal;

measuring an average throughput of a received signal;

calculating a value obtained by multiplying a square error calculated at each modulation level by a weighted calculation from both a threshold power level for switching a modulation level and a average throughput as a likelihood value at each modulation level; and estimating a modulation level corresponding to a maximum likelihood value of all the likelihood values at each modulation level.

4. A radio transmission system for flexibly controlling a modulation level according to conditions of transmission paths, comprising:

a circuit for calculating a square error of a minimum value of distances between each signal point to be received at a modulation level and at a signal point of a received signal at each modulation level;

a circuit for measuring a received power level of a received signal;

a circuit for calculating a value obtained by multiplying a square error calculated at each modulation level by a weighted calculation from both a threshold power level for switching a modulation level and an average throughput as a likelihood value at each modulation level; and a circuit for estimating a modulation level corresponding to a maximum likelihood value of all the likelihood values at each modulation level.

5. A radio transmission system for flexibly controlling a modulation level according to conditions of transmission paths, comprising:

a circuit for calculating a square error of a minimum value of distances between each signal point to be received at a modulation level and a signal point of a received signal for each modulation level;

a circuit for measuring an average throughput of a received signal;

a circuit for changing each threshold power level for switching a modulation level, based on an average throughput;

a circuit for measuring a received power level of a received signal;

a circuit for calculating a value obtained by multiplying a square error calculated at each modulation level by a weighted calculation from both a threshold power level for switching a modulation level and an average throughput as a likelihood value at each modulation level; and a circuit for estimating a modulation level corresponding to a maximum likelihood value of all the likelihood values at each modulation level.

6. A radio transmission system for flexibly controlling a modulation level according to conditions of transmission paths, comprising:

a circuit for calculating a square error of a minimum value of distances between each signal point to be received at a modulation level and a signal point of a received signal for each modulation level;

a circuit for measuring a received power level of a received signal;

a circuit for reporting weighted functions corresponding to a reported average throughput;

a circuit for measuring an average throughput of a received signal;

a circuit for calculating a value obtained by multiplying a square error calculated at each modulation level by a weighted calculation from both a threshold power level for switching a modulation level and an average throughput as a likelihood value at each modulation level; and a circuit for estimating a modulation level corresponding to a maximum likelihood value of all the likelihood values at each modulation level.

* * * * *